United States Patent
Shioyama et al.

(10) Patent No.: US 6,818,736 B2
(45) Date of Patent: Nov. 16, 2004

(54) POLYMERIC MATERIAL, MOLDED PRODUCT AND METHODS FOR THEIR PRODUCTION

(75) Inventors: Manabu Shioyama, Osaka (JP); Masayuki Shimada, Sakai (JP); Yasuyuki Agari, Osaka (JP); Motoomi Arakawa, Osaka (JP); Kazuaki Sukata, Yawata (JP)

(73) Assignees: Orient Chemical Industries, Ltd., Osaka-fu (JP); Osaka Municipal Government, Osaka-fu (JP)

( * ) Notice: Subject to any disclaimer, the term of this patent is extended or adjusted under 35 U.S.C. 154(b) by 158 days.

(21) Appl. No.: 10/170,568

(22) Filed: Jun. 14, 2002

(65) Prior Publication Data

US 2003/0045675 A1 Mar. 6, 2003

(30) Foreign Application Priority Data

Jun. 15, 2001 (JP) ........................................ 2001-181950

(51) Int. Cl.$^7$ .................................................. C08F 6/00
(52) U.S. Cl. .................... 528/480; 264/176.1; 264/219; 422/131; 528/193; 528/194; 528/196; 528/271; 528/272; 528/384
(58) Field of Search .............................. 264/176.1, 219, 264/328.1, 330; 422/131; 528/480, 193, 194, 196, 271, 272, 384, 176, 190, 192, 198, 397, 398, 386

(56) References Cited

U.S. PATENT DOCUMENTS

| | | |
|---|---|---|
| 4,375,525 A | 3/1983 | Idel et al. |
| 4,636,573 A | 1/1987 | Pastor et al. |
| 4,670,498 A | 6/1987 | Furusawa et al. |
| 4,985,328 A * | 1/1991 | Kumagai et al. ...... 430/108.23 |

FOREIGN PATENT DOCUMENTS

| | | |
|---|---|---|
| EP | 0507178 A2 | 10/1992 |
| GB | 1203869 | 9/1970 |

* cited by examiner

*Primary Examiner*—Terressa Boykin
(74) *Attorney, Agent, or Firm*—Birch, Stewart, Kolasch & Birch, LLP

(57) ABSTRACT

Disclosed is a polymeric material obtained by melt-kneading, using a kneading apparatus, a resin composition containing an organic polymer having no metal alkoxy group and a metal alkoxide compound. The organic-inorganic hybrid polymeric material, a polymeric material containing this component, and a molded products obtained therefrom are suitable for high-performance and high-function plastic applications. Simple and practical processes for producing them at high productivity and at low cast are also disclosed.

43 Claims, No Drawings

POLYMERIC MATERIAL, MOLDED PRODUCT AND METHODS FOR THEIR PRODUCTION

BACKGROUND OF THE INVENTION

1. Field of the Invention

The present invention relates to a polymeric material useful for various plastic material, to a molded product and to a method for there production.

2. Description of the Background Art

Plastics are substituting for existing materials, such as metal, glass, wood, and paper, due to their molding processabilities, high productivities, light weights, flexibilities, excellent mechanical or electrical properties, etc. Their application range is wide and they are used for a variety of applications such as construction materials, structural or mechanical parts of electric or electronic products, exterior or interior parts of automobiles, vehicles, aircrafts and ships, miscellaneous goods and packing materials. For this reason, there are many kinds of plastics and those of various types are marketed.

However, there is a great demand from the market for improvement in various characteristics or cost, and alloying of different plastics and compounding with other ingredients are performed briskly. For example, about the improvement in mechanical property, heat resistance, dimensional stability and the like, organic-inorganic composite materials in which a solid inorganic material typified by glass fiber and carbon fiber has been blended were studied. This technique has improved strength, thermal deformation resistance in a short period of time, dimensional stability and the like.

However, a plastic and an inorganic material are generally incompatible and it is difficult to finely disperse both materials and, consequently, the size of dispersed particles of an inorganic material in an organic-inorganic composite material is generally up to the order of micrometers. Since the size of particles have great effects on strength such as tensile strength and the strength is reduced as particles becomes larger (see L. E. Nielsen, Dynamic Properties of Polymer and Composite Material, p. 253), it is natural that there are limitations to the improvement in strength of organic-inorganic composite materials described above. Further, for some types of plastics, e.g., ABS resin, polyamide 6-6, polycarbonate, polyacetal and fully aromatic polyester, there have been raised new problems such as reduction in impact strength caused by decrease in interface strength.

On the other hand, organic-inorganic hybrid polymeric materials containing inorganic elements such as Si, Ti and Zr introduced into their backbone have been studied for the purpose of improvement in various physical properties of plastics including surface hardness, luster, antifouling property, strength, heat resistance, weather resistance, chemical resistance and the like.

The size of dispersed particles of each component of an organic-inorganic hybrid polymeric material is up to the orders of sub-microns to nanometers and it is possible to disperse the components at the molecular level. As a method for the preparation thereof, for example, there have been known a method subjecting an organic monomer or an organic polymer and an inorganic backbone-containing compound to radical copolymerization and a method bonding an inorganic functional group such as alkoxysilane as a side chain to an organic polymer and thereafter cross-linking it.

For example, Japanese Patent Kokai Publication No. H5-43679 and Japanese Patent Kokai Publication No. H5-86188 disclose a method for obtaining an organic-inorganic hybrid polymeric material by allowing a vinyl polymer and a silicon compound to react and thereafter cross-linking them by a sol-gel method. Japanese Patent Kokai Publication No. H8-104710 and Japanese Patent Kokai Publication No. H8-104711 disclose a method for obtaining an organic-inorganic hybrid polymeric material by subjecting vinyl monomers to radical polymerization with an alkoxysilyl group-terminated azo-type initiator and hydrolyzing and condensing the resulting alkoxysilyl group-terminated vinyl polymer. Further, we reported in Japanese Patent Kokai Publication No. H11-209596, etc. a method for obtaining an organic-inorganic hybrid polymeric material by synthesizing an alkoxysilyl group-terminated polycarbonate or polyarylate and thereafter hydrolyzing and polycondensing it by a sol-gel method.

However, these organic-inorganic hybrid polymeric materials require a production process containing two steps: first allowing an organic monomer or organic polymer and an inorganic compound to react to synthesize an intermediate compound and then allowing the inorganic component introduced to react again. Further, the inorganic compound to be used is often specific and is, in general, expensive.

Moreover, most of the conventional organic-inorganic hybrid polymeric materials are produced by methods in a solution system using a sol-gel method. The sol-gel method is a method for molding glass or ceramic by starting from a solution, passing a state of sol containing fine particles and further passing a state of gel containing a liquid or the air in a space defined by the frames of a solid (see Sumio SAKKA, Science of the Sol-Gel Method, Introduction). Accordingly, although simple structures such as films and rods can be produced, it is very difficult to produce molded products of complex shape. The methods carried out in a solution system are disadvantageous also in terms of productivity and cost and, therefore, are not practical except for specific applications.

Japanese Patent Kokai Publication No.2000-327930 discloses a method for producing an organic-inorganic hybrid polymeric material by heat-treating an organic polymer, an organic polymer having a metal alkoxy group, a metal alkoxide compound or a metal oxide with a mixer such as a Brabender. However, such a mixer has only a poor kneading ability since its mixing portion is constituted of a pair of blades having a short shaft. In addition, one pair of blades are fixed so that it is impossible to set the conditions of the kneading portion at will depending upon a material to be employed. Such a mixer, therefore, is difficult to finely disperse an organic polymer and an inorganic component such as metal oxide, which are of great incompatibility, with each other and is not suitable for the preparation of organic-inorganic hybrid polymeric materials. Furthermore, such a mixer has many problems with respect to steps and productivity for its industrial use since it is a batch-type instrument.

SUMMARY OF THE INVENTION

The present invention solves the conventional problems and an object of the present invention is to provide an organic-inorganic hybrid polymeric material suitable for high-performance and high-function plastics or a polymeric material containing that component, molded products obtained by processing those polymeric materials and simple and practical methods for producing those products at high productivity and at low cost.

The present invention relates to a polymeric material obtained by melt-kneading, using a kneading apparatus, a resin composition that contains an organic polymer not having any metal alkoxy group and a metal alkoxide compound and that contains no organic polymer having a metal alkoxy group and to a polymer molded product obtained by processing the polymeric material using a molding machine. The present invention also relates to methods for producing the polymeric material and polymer molded product.

DETAILED DESCRIPTION OF THE INVENTION

The present invention provides an organic-inorganic hybrid polymeric material or a polymeric material containing this component, both polymeric materials being suitable for high-performance and high-function plastic material applications, molded products obtained by processing these polymeric materials, and simple and practical methods for producing the polymeric materials and molded products.

The conventional organic-inorganic hybrid polymeric materials are, in general, produced via two steps consisting of a step of synthesizing an intermediate compound by allowing an organic monomer or polymer to react with an inorganic compound and a subsequent step of allowing the inorganic component introduced to react again. Further, in the reaction of the inorganic component in the second step, it is general to employ the sol-gel method. The sol-gel method is a method for producing glass or ceramic by starting from a solution and passing through a state of sol containing fine particles and a subsequently occurring state of gel containing a liquid or the air in a space in the framework of the solid (see Sumio Sakka, Science of Sol-Gel Method, Introduction). Accordingly, the conventional processes are those carried out in a solution system using a solvent. However, such a process performed in a solution system is disadvantageous in cost due to use of a large amount of solvent and is of low productivity. Further, it is difficult to produce a molded product of complex shape by that method. Given those facts, a process for producing an organic-inorganic hybrid polymeric material simply and practically at low cost has been awaited.

We studied earnestly in order to respond such a request and, as a result, have developed a method for producing an organic-inorganic hybrid polymeric material or a polymeric material containing that component by melt-kneading a resin composition containing an organic polymer and a metal alkoxide compound in a kneading apparatus in a single step without using a large amount of solvent. Further, the resulting polymeric material can be processed with a molding apparatus and a molded product of an organic-inorganic hybrid polymeric material or a polymeric material containing that component can be prepared. Judging from these facts, the present invention is a simple and practical approach.

Specifically, the components necessary as raw materials are an organic polymer and a metal alkoxide compound. Raw materials containing these components are allowed to react by being heated in a kneading apparatus. At this time, most of the metal alkoxide compound undergoes hydrolysis, condensation, dealcoholation, and deetheration to form metal-oxygen-metal covalent bonds and, eventually, forms a metal oxide. The size of the resulting metal oxide is under the influence of a composition ratio of the metal alkoxide compound in the raw material, the equivalent amount of functional groups, the kneading conditions and the like. It, however, is fully possible to make the size of the metal oxide smaller than the size of dispersion particles of the inorganic material contained in the aforementioned organic-inorganic composite material.

A certain kind of bond contained in the organic polymer is preferably an ester bond, a carbonate bond, an amide bond, a urethane bond, etc. Generally, the sol-gel method in which treatment is performed at temperatures near room temperature hardly causes reactions between those bonds and a metal alkoxide compound. However, treatment using a kneading apparatus to which a high temperature and a high pressure can be applied makes those reactions possible to occur. When an organic polymer has any of those bonds, a metal alkoxide compound can be bonded with the organic polymer through transesterification reaction. If the aforementioned bond is contained in a main chain of an organic polymer (for example, in the cases of polyester, polycarbonate, polyamide, etc.), the activity of the organic polymer generally becomes low. Nevertheless, because a metal hydroxyl group (e.g., a silanol group) generated in a metal alkoxide compound has high reactivity, part thereof undergoes transesterification reaction with those bonds to form an organic-inorganic hybrid polymeric material containing an organic polymer and a metal oxide covalently bonded together.

The treatment with a kneading apparatus is carried out not only for causing the above-mentioned reaction but also has an effect of finely dispersing a metal oxide or an inorganic component in an organic polymer uniformly. Thus, the treatment using a kneading apparatus makes it possible to produce a polymeric material in which an inorganic material is dispersed more finely than the inorganic material dispersed in the conventional organic-inorganic composite materials, and in which an organic polymer is bonded with a metal oxide or an inorganic component.

As the kneading apparatus, those conventionally employed may be used. Among them, kneading apparatuses for plastic processing are preferable and single or twin screw extruders are more preferable. In these extruders, screw segments or the like at kneading sites can be freely rearranged and it is possible to set conditions suitable for a material to be treated. Such extruders are used for the reactive processing, which is a major interest plastic processing recently, and is instruments of very high kneading capacities.

Kneading conditions such as temperature, kneading speed and pressure may suitably be determined depending upon the organic polymer to be employed and are not particularly limited on condition that the organic polymer is molten and is fully kneaded with other raw materials. In the case of using multiple kinds of raw materials, it is preferable to premix all or some of the raw materials using an appropriate mixing apparatus. If the raw materials are expected to be mixed easily, there is no necessity of premixing. In addition, if the kneading apparatus has incidental equipment such as a side feeder and a liquid feeding apparatus, it is also possible to use such equipment to feed the raw materials one after another in a suitable order. Since a metal alkoxide compound is generally liquid, a liquid feeding apparatus is preferably employed for the feed of that compound. If kneading or a reaction can be accomplished only to an insufficient degree after onetime treatment, it is possible to treat a kneaded material discharged two or more times using the same kneading apparatus or to treat that material using a plurality of kneading apparatus and/or kneading apparatus of different types. However, from the consideration to practical usability, it is desirable to optimize kneading conditions depending upon the raw materials to be used and finish kneading in a single treatment.

As a method for molding, it is possible to perform molding directly after kneading with an extrusion molding machine or to form a strand obtained after kneading into a suitable form such as pellets and, thereafter, process it with an injection molding machine. As a molding machine, various types of molding machines conventionally employed for plastic processing may be used. A molding machine to be used may be suitably determined depending upon the shape of a desired molded product. For example, in the case where a molded product having a relatively simple shape, such as a film, a sheet, a rod or a pipe, is intended, an extrusion molding machine is recommended. In the case of producing a molded product of a complex shape, an injection molding machine is considered to be general.

The following are specific examples.

1) An organic polymer having an ester bond, a carbonate bond, an amide bond, a urethane bond, etc. and a metal alkoxide compound are melt-kneaded with a kneading apparatus while being heated. By this operation, the metal alkoxide compound or the metal alkoxide compound and the organic polymer are caused to react. At this time, the product can be controlled by the composition ratio of the organic polymer and the metal alkoxide compound, the number of the aforementioned bonds in the organic polymer, kneading conditions and the like. An organic-inorganic hybrid polymeric material in which a metal oxide and/or inorganic components are dispersed finely and these components are bonded to a polymer, or a polymeric material containing the organic-inorganic hybrid polymeric material as a component, is prepared. If the functional group equivalent of a metal alkoxide compound is bi-functional, the ratio at which an organic-inorganic hybrid polymeric material of linear structure is generated, becomes higher. If the functional group equivalent is tri-functional or more, the ratio at which an organic-inorganic hybrid polymeric material of three-dimensional structure is generated, becomes higher. The resulting polymeric material may be shaped directly after kneading or may be shaped at another time after being taken out.

2) An organic polymer material having an ester bond, a carbonate bond, an amide bond, an urethane bond, etc., an organic polymer not having the aforementioned bond(s), and a metal alkoxide compound are melt-kneaded with a kneading apparatus while being heated. By this operation, the metal alkoxide compound or the metal alkoxide compound and the organic polymer having the aforementioned bond(s) are caused to react. The organic polymer not having the aforementioned bond(s) is used for the purpose of forming a matrix in a polymeric material and, therefore, all of the organic polymers must exhibit compatibility. By this fact, an organic polymeric material containing, as a component, an organic-inorganic hybrid polymeric material in which a metal oxide and/or inorganic components are dispersed finely and these components and organic polymers are bonded together, is prepared. In this polymeric material, the organic-inorganic hybrid polymeric material acts as a surface modifier and provides organic polymers and metal oxide and/or inorganic components, which are generally incompatible, with affinity. The resulting polymeric material may be shaped directly after kneading or may be shaped at another time after being taken out.

Organic Polymer

In the present invention, an organic polymer is used for the following two purposes.

One purpose is to cause an organic polymer to react with a metal alkoxide compound to synthesize an organic-inorganic hybrid polymeric material. For this purpose, a reaction site must be present in the organic polymer and, concretely speaking, the organic polymer must be one having an ester bond, a carbonate bond, an amide bond, an urethane bond, etc., provided that these bonds may be present either in a main or side chain or in a part of a functional group.

Specific examples of the organic polymer include polyester, polycarbonate, polyarylate, polysulfone, polyethersulphone, polyamide and polyphthalamide having the aforementioned bonds in their main backbones. An example of an organic polymer having the aforementioned bonds in its side chain is polyacrylate (acrylic resin). Polyacrylates refer to polymers of esters of methacrylic acid or acrylic acid (see, Fukuji Kurihara, Encyclopedia of Polymeric Material, p. 212). Further, ones obtained by modifying those organic polymers, thermoplastic resins or precursors of thermoplastic elastomers having, as a main backbone, polyethylene, polypropylene, vinyl chloride resin, polystyrene, polyacetal, polyphenylene ether, polymethylpenten, polyphenylene sulfide, polyimide, polyether imide, polyether ether ketone and the like, or precursors of thermosetting resins having, as a main backbone, phenol resin, epoxy resin, acrylic resin, melamine resin, alkyd resin, urea resin, silicone resin and the like, to introduce the aforementioned bonds into a molecule, may also be used.

The equivalent number of the aforementioned bonds contained in one molecule of an organic polymer is not particularly limited, but it is preferably from 1 to 1000, more preferably from 2 to 100. If the equivalent number of the bonds is less than 1, there is possibility that no organic-inorganic hybrid polymeric material can be synthesized. If too much, cross-linking sites in an organic-inorganic hybrid polymeric material will become too many and there is a possibility that a resulting polymeric material will be fragile.

Another purpose of the use of an organic polymer is to form a matrix in a polymeric material. For this purpose, the organic polymer is not particularly restricted with respect to its structure and any organic polymer may be used as long as it can provide sufficient strength as various kinds of plastic materials when being used as a matrix of a polymeric material.

Specific examples of the main backbone of an organic polymer include thermoplastic resins or precursors of thermoplastic elastomers such as polyethylene, polypropylene, vinyl chloride resin, polystyrene, methyl methacrylate resin, polyamide, polyacetal, polycarbonate, polyester, polyphenylene ether, polymethyl pentene, polysulfone, polyethersulphone, polyphthalimide, polyphenylene sulfide, polyarylate, polyimide, polyether imide, polyether ether ketone and the like, or precursors of thermosetting resins such as phenol resin, epoxy resin, acrylic resin, melamine resin, alkyd resin, urea resin, silicone resin and the like. Among them, thermoplastic resins are preferable. From the aspect of high performance, engineering plastics such as polyamide, polyacetal, polycarbonate, polysulfone and polyarylate are more preferable.

In the present invention, when intending to obtain a polymeric material constituted only of an organic-inorganic hybrid polymeric material, it is recommended to use an organic polymer capable of attaining only the former purpose among the above-described purposes. In this case, a single kind of organic polymer may be used alone or a mixture of multiple kinds of organic polymers may be used. When intending to obtain a polymeric material containing an organic-inorganic hybrid polymeric material for reasons of cost, physical properties or the like, it may be used a single kind of or multiple kinds of organic polymers capable of attaining each of the above purpose. What type of organic polymer(s) is used, is determined depending on the purpose, provided that when multiple kinds of organic polymers are used, all of the organic polymer must show compatibility in order to prevent macro phase separation in a polymeric material.

The organic polymer to be used in the present invention may be that having, as its main backbone, one component selected from the aforementioned polymers and precursors and may also be that having a copolymer backbone made up of multiple components selected from those mentioned above. A mixture of multiple kinds of organic polymers may be used as long as all of them exhibit compatibility. The organic polymer may be of any form such as branched form and linear form. Of course, products in the market may be used. The organic polymer may be that synthesized by any process. The molecular weight of the organic polymer is not particularly restricted, but it is preferably from about 500 to about 100,000, and more preferably from about 1,000 to about 50,000, in terms of number average molecular weight. The organic polymer may have or may not have a functional group other than a metal alkoxy group.

Metal Alkoxide Compound

In the present invention, any type of metal alkoxide compound can be used. Preferred are compounds represented by formula (1):

$$A_pM \quad (1)$$

wherein A is an alkoxy group having from 1 to 8, preferably from 1 to 4 carbon atoms, M indicates a metal element selected from the group consisting of Si, Ti, Zr, Fe, Cu, Sn, B, Al, Ge, Ce, Ta, W and the like, preferably the group consisting of Si, Ti and Zr, and p is an integer of from 2 to 6.

Specifically mentioned are tetraalkoxysilane such as tetramethoxysilane, tetraethoxysilane, tetraisopropoxysilane and tetrabutoxysilane; tetraalkoxytitanium such as tetra-n-propoxytitanium, tetraisopropoxytitanium and tetrabutoxytitanium; tetraalkoxyzirconium such as tetra-n-propoxyzirconium, tetraisopropoxyzirconium and tetrabutoxyzirconium; and metal alkoxide such as dimethoxycopper, diethoxybarium, trimethoxyboron, triethoxygallium, tributoxyaluminum, tetraethoxygermanium, tetrabutoxylead, penta-n-propoxytantalum, and hexaethoxytungsten.

Other examples include compounds represented by formula (2):

$$R_kA_lM(R'_mX)_n \quad (2)$$

wherein R is hydrogen or an alkyl group having from 1 to 12, preferably from 1 to 5 carbon atoms or a phenyl group, A is an alkoxy group having from 1 to 8, preferably from 1 to 4 carbon atoms, M indicates a metal element selected from the group consisting of Si, Ti, Zr, Fe, Cu, Sn, B, Al, Ge, Ce, Ta, W and the like, preferably the group consisting of Si, Ti and Zr, R' is an alkylene or alkylidene group having from 1 to 4, preferably from 2 to 4 carbon atoms, X represents a general functional group such as an isocyanate group, an epoxy group, a carboxyl group, an acid halide group, an acid anhydride group, an amino group, a thiol group, a vinyl group, a methacryl group and a halogen atom, k is an integer of from 0 to 5, 1 is an integer of from 1 to 5, m is 0 or 1, and n is an integer of from 0 to 5.

When Si is taken as an example, specific examples of the metal alkoxide compound are as follows:

(alkyl)alkoxysilane such as trimethoxysilane, triethoxysilane, tri-n-propoxysilane, dimethoxysilane, diethoxysilane, diisopropoxysilane, monomethoxysilane, monoethoxysilane, monobutoxysilane, methyldimethoxysilane, ethyldiethoxysilane, dimethylmethoxysilane, diisopropylisopropoxysilane, methyltrimethoxysilane, ethyltriethoxysilane, n-propyltri-n-propoxysilane, butyltributoxysilane, dimethyldimethoxysilane, diethyldiethoxysilane, diisopropyldiisopropoxysilane, dibutyldibutoxysilane, trimethylmethoxysilane, triethylethoxysilane, tri-n-propyl-n-propoxysilane, tributylbutoxysilane, phenyltrimethoxysilane, diphenyldiethoxysilane and triphenylmethoxysilane;

(alkyl)alkoxysilane having an isocyanate group such as 3-isocyanatopropyltriethoxysilane, 2-isocyanatoethyltri-n-propoxysilane, 3-isocyanatopropylmethyldimethoxysilane, 2-isocyanatoethylethyldibutoxysilane, 3-isocyanatopropyldimethylisopropoxysilane, 2-isocyanatoethyldiethylbutoxysilane, di(3-isocyanatopropyl)diethoxysilane, di(3-isocyanatopropyl)methylethoxysilane and ethoxysilane triisocyanate;

(alkyl)alkoxysilane having an epoxy group such as 3-glycidoxypropyltriethoxysilane, 3-glycidoxypropylmethyldimethoxysilane, 3-glycidoxypropyldimethylethoxysilane, 2-(3,4-epoxycyclohexyl)ethyltrimethoxysilane and 3,4-epoxybutyltrimethoxysilane;

(alkyl)alkoxysilane having a carboxyl group such as carboxymethyltriethoxysilane, carboxymethylethyldiethoxysilane and carboxyethyldimethylmethoxysilane;

alkoxysilane having an acid anhydride group such as 3-(triethoxysilyl)-2-methylpropylsuccinic anhydride;

alkoxysilane having an acid halide group such as 2-(4-chlorosulfonylphenyl)ethyltriethoxysilane;

(alkyl)alkoxysilane having an amino group such as 3-aminopropyltrimethoxysilane, 3-aminopropyltriethoxysilane, N-2-(aminoethyl)-3-aminopropyltriethoxysilane, N-2-(aminoethyl)-3-aminopropylmethyldimethoxysilane and N-phenyl-3-aminopropyltrimethoxysilane;

(alkyl)alkoxysilane having a thiol group such as 3-mercaptopropyltrimethoxysilane, 2-mercaptoethyltriethoxysilane and 3-mercaptopropylmethyldimethoxysilane;

(alkyl)alkoxysilane having a vinyl group such as vinyltrimethoxysilane, vinyltriethoxysilane and vinylmethyldiethoxysilane;

(alkyl)alkoxysilane having a methacryl group such as 3-methacryloxypropyltrimethoxysilane, 3-methacryloxypropyltriethoxysilane and 3-methacryloxypropylmethyldimethylsilane; and (alkyl)alkoxysilane having a halogen atom such as triethoxyfluorosilane, 3-chloropropyltrimethoxysilane, 3-bromopropyltriethoxysilane and 2-chloroethylmethyldimethoxysilane.

Similar compounds may, of course, be mentioned for other metals such as Ti, Zr, Fe, Cu, Sn, B, Al, Ge, Ce, Ta and W, as well as Si.

Only a single kind of or multiple kinds of such metal alkoxy compounds may be employed. Further, a metal alkoxide compound containing, in one molecule, multiple kinds of metal elements, e.g., Mg[Al(iso-OC$_3$H$_7$)$_4$]$_2$, Ba[Zr$_2$(OC$_2$H$_5$)$_9$]$_2$, (C$_3$H$_7$O)$_2$Zr[Al(OC$_3$H$_7$)$_4$]$_2$, a metal alkoxide compound of oligomer type having, in one molecule, two or more repeating units, e.g., tetramethoxysilane oligomer and tetraethoxysilane oligomer, or a metal alkoxide compound having a three-dimensional structure, e.g., polymethylsilsesquioxane and polyphenylsilsesquioxane may be employed. Moreover, the alkoxy group may be replaced by an acetoxy group, an acetylacetoxy group or the like. Furthermore, the metal alkoxide compound may partially be hydrolyzed or polycondensed.

Polymeric Material

The polymeric material of the present invention is obtained by melt-kneading, with a kneading apparatus, a resin composition containing an organic polymer and a metal alkoxide compound. Most of the metal alkoxide compound is converted to metal oxide through this treatment. However, if an organic polymer having an ester bond, a carbonate bond, an amide bond, an urethane bond or the like is used, part of the metal alkoxide compound reacts with this organic polymer to form an organic-inorganic hybrid polymeric material in which the organic polymer and the metal oxide and/or inorganic components are bonded together and these components are dispersed finely. Further, when the composition ratio of the organic polymer and the metal alkoxide compound, the number of the aforementioned bonds in the organic polymer, kneading conditions and the like are controlled, or when an organic polymer not having the aforementioned bonds is used together, it is also possible to obtain a polymeric material containing an organic-inorganic hybrid polymeric material as a component. In the case of such a polymeric material, the organic-inorganic hybrid polymeric material contained acts as a surface modifier and provides an organic polymer and a metal oxide, which are generally incompatible, with affinity. From these facts, the polymeric material obtained in the present invention is expected to have superior characteristics and new functions.

The composition ratio of the organic polymer and the metal alkoxide compound may be set optionally depending upon desired characteristics or functions. Considering operationality during treatment and characteristics of a material to be obtained, however, the weight ratio of those components is preferably in the range of from 1:99 to 99.9:0.1, more preferably from 10:90 to 99:1. If the amount of the organic polymer used is too small, it becomes difficult to carry out kneading. Not all of the metal alkoxide compound necessarily reacts with the organic polymer and there is a possibility of loosing some of the metal alkoxide compound due to the heat generated or applied during the kneading depending upon the type of the metal alkoxide compound. Accordingly, if the amount of the metal alkoxide compound used is too small, the amount of the organic-inorganic hybrid polymeric material to be molded will become small and characteristics of the resulting material may not be improved.

In the case where an organic polymer having an ester bond, a carbonate bond, an amide bond, an urethane bond or the like and an organic polymer not having such a bond are used together, the content of the organic polymer having the aforementioned bond is preferably 1% or more, and more preferably 5% or more. If the content of an organic polymer having the aforementioned bond is too small, characteristics of a material may not be improved. Further, it may become easier for the organic polymer not having the aforementioned bond and the metal oxide and/or the inorganic components to form macro phase separation. Characteristics of a polymeric material may also be deteriorated.

Methods for Producing a Polymeric Material and a Molded Product

A method for producing a polymeric material in the present invention is characterized by melt-kneading a resin composition containing an organic polymer and a metal alkoxide compound with a kneading apparatus to allow the metal alkoxide compound and/or the metal alkoxide compound and the organic polymer to react. This makes it possible to produce simply at high productivity and low cost a polymeric material in which an organic polymer and a metal oxide and/or inorganic components, which are generally incompatible with each other, are covalently bonded and these component are uniformly and finely dispersed in the organic polymer. A resulting polymeric material can be shaped, and molded products of complex shape can also be produced. The polymeric material may be shaped directly from its molten state after kneading. Alternatively, a strand discharged from a kneading apparatus may be shaped into a suitable form such as pellets and then be processed again.

The following are specific examples of the methods of producing the polymeric material and molded product of the present invention.

1) An organic polymer having any of an ester, carbonate, amide and urethane bonds is charged from a feeder of a single or twin screw extruder and is subjected to heat treatment to a molten state. Next, the organic polymer is melt-kneaded along with charging of a metal alkoxide compound to the polymer from a liquid feeder. Through this operation, the metal alkoxide compound and/or the metal alkoxide compound and the organic polymer are allowed to react. During the above operations, the content of an organic-inorganic hybrid polymeric material in a polymeric material can be adjusted by, for example, controlling the rate of feeding the metal alkoxide compound. The melt-kneaded material is then discharged from the extruder and, simultaneously, is shaped directly into a film, sheet, rod, pipe or the like using an extrusion molding machine or the like. The alternative way is to shape a strand discharged from the extruder into a suitable form such as pellets and, thereafter, is shaped again into a desired form using an injection molding machine or the like. A resulting molded product comprises an organic-inorganic hybrid polymeric material comprising an organic polymer and metal oxide and/or inorganic components bound together or a polymeric material comprising an organic polymer containing the organic-inorganic hybrid material finely dispersed uniformly therein.

2) An organic polymer having any of an ester, carbonate, amide and urethane bonds is charged from a feeder of a single or twin screw extruder and is subjected to heat treatment to a molten state. Next, melt-kneading is carried out while a solution containing a metal oxide compound that has been partially hydrolyzed and polycondensed by being dissolved in a suitable solvent followed by the addition of a trace of moisture, is charged from a liquid feeder. This operation further effects the reaction of the metal oxide compound and, simultaneously, also causes the metal alkoxide compound and the organic polymer to react. During such operations, the content of an organic-inorganic hybrid polymeric material in a polymeric material can be adjusted by, for example, controlling the rate of feeding the metal alkoxide compound. The melt-kneaded material is then discharged from the extruder and, simultaneously, is shaped into a film, sheet, rod, pipe or the like using an extrusion molding machine or the like. The alternative way is to shape a strand discharged from the extruder into a suitable form such as pellets and, thereafter, is shaped again into a desired form using an injection molding machine or the like. A resulting molded product comprises an organic-inorganic hybrid polymeric material comprising an organic polymer and metal oxide and/or inorganic components bound together or a polymeric material comprising an organic polymer containing the organic-inorganic hybrid material finely dispersed uniformly therein.

3) An organic polymer having any of an ester, carbonate, amide and urethane bonds is charged from a feeder of a single or twin screw extruder and is subjected to heat treatment to a molten state. Next, the organic polymer is melt-kneaded along with charging of a metal alkoxide compound to the polymer from a liquid feeder. Through this operation, the metal alkoxide compound and/or the metal alkoxide compound and the organic polymer are allowed to react. After that, an organic polymer having none of the aforementioned bonds is charged from a side feeder and additional melt-kneading is carried out. A melt-kneaded material finally obtained is discharged from the extruder and, simultaneously, is shaped into a film, sheet, rod, pipe or the like using an extrusion molding machine or the like. The alternative way is to shape a strand discharged from the extruder into a suitable form such as pellets and, thereafter, is shaped again into a desired form using an injection molding machine or the like. A resulting molded product comprises a polymeric material comprising an organic polymer containing an organic-inorganic hybrid material finely dispersed uniformly therein.

In the above production example, the composition ratio of the organic polymer and the metal alkoxide compound may be set optionally depending upon desired characteristics or functions. Considering operationality during treatment and characteristics of a material to be obtained, however, the weight ratio of those components may be set into the range of, for example, from 1:99 to 99.9:0.1, preferably from 10:90 to 99:1, and more preferably from 50:50 to 99:1.

In the case where an organic polymer having any of an ester, carbonate, amide and urethane bonds and an organic polymer not having such bonds are used together, the content of the organic polymer having the aforementioned bond is preferably 1% or more, and more preferably 5% or more. If the content of an organic polymer having the aforementioned bond is too small, characteristics of a polymeric material may not be improved or may be deteriorated.

Kneading and shaping conditions including temperature, speed, pressure and the like are suitably determined depending upon the type of the organic polymer to be used and are not particularly restricted as long as those are conditions where the organic polymer is molten and is kneaded fully with other raw materials. If kneading is accomplished to only an insufficient degree through one treatment, the kneaded material discharged may be treated in the same kneading apparatus twice or more times or the materials may be treated with a plurality of kneading apparatuses and/or kneading apparatuses of different types. Considering the aspect of practical use, however, it is preferable to finish kneading with one treatment by optimizing kneading conditions.

In the kneading step in the present invention, a small amount of moisture or catalyst may be added for the purpose of further improvement of the reactivity of the metal alkoxide compound and/or of the metal alkoxide compound and the organic polymer. The amount of moisture is not particularly limited and may suitably be set depending upon the physical properties of the raw materials to be used, but too much amount of moisture will cause a risk of accidents resulting from burst of steam or the like. Further, it is necessary to set the amount of moisture carefully because a risk of hydrolysis will be caused depending upon the type of the organic polymer. As a catalyst, various kinds of acidic catalysts, basic catalysts and metal catalysts may be used. However, suitable selection of the type and amount of a catalyst is required because an organic polymer may be decomposed by a catalyst depending upon the type of the organic polymer.

In all of the steps in the present invention, metal, e.g., Si, Ti, Zr, Fe, Cu, Sn, B, Al, Ge, Ce, Ta and W, metal oxide, metal complex, inorganic salt and the like may be used for the purpose of improving or providing functions such as strength, hardness, weather resistance, chemical resistance, flame retardancy and electrostaticity. Further, plasticizers such as those generally employed may optionally be used depending upon the type of the organic polymer to be used.

The polymeric material produced by the method of the present invention contains an organic polymer well having characteristics possessed by an inorganic material, such as mechanical strength, heat resistance, weather resistance, surface hardness, rigidity, water resistance, chemical resistance, antifouling property and flame retardancy. In other words, the inorganic material well has characteristics possessed by the organic polymer, such as impact resistance, flexibility and processability.

The present invention provides polymeric materials required to have high performance and high function such as films, structural materials, optical materials, surface modifiers, electric or electronic materials and medical materials, and a simple and practical method for producing the same at low cost. In addition, the aforementioned high-performance and high-function polymeric materials having complex shapes can be molded because general molding machines for plastics such as injection molding machines and extrusion molding machines can be employed in the production method of the present invention.

EXAMPLE 1

1500 g of polycarbonate (Iupilon) manufactured by Mitsubishi Engineering-Plastics Corporation and 16.6 g of MKC Silicate MS-56 manufactured by MITSUBISHI CHEMICAL CORPORATION were mixed uniformly with a Henschel mixer Model FM10B manufactured by Mitsui-Miike Chemical Engineering Machines Co., Ltd. The resulting mixture was charged into a compact high-speed twin screw extruder Model KZW15-45MG manufactured by TECHNOVEL CORPORATION and was melt-kneaded at a feeder rotation speed of 50 rpm, a screw rotation speed of 200 rpm and a temperature of 280° C. A strand discharged was cooled and was pelletized with a pelletizer. The resulting pellets were treated with a compact injection molding machine HM-7DENKEY manufactured by NISSEI PLASTIC INDUSTRIAL CO., LTD. under a basic conditions at a melting temperature of 300° C. and various kinds of specimens were prepared.

(Organic polymer:Metal alkoxide=98.9:1.1~99:1)

EXAMPLE 2

1500 g of polycarbonate (Iupilon) manufactured by Mitsubishi Engineering-Plastics Corporation was charged into a compact high-speed twin screw extruder Model KZW15-45MG manufactured by TECHNOVEL CORPORATION. While the polycarbonate was treated at a feeder rotation speed of 50 rpm, a screw rotation speed of 200 rpm and a temperature of 280° C., 156 g of tetraethoxysilane was charged slowly with a liquid feeder and melt-kneading was carried out. A strand discharged was cooled and was pelletized with a pelletizer. The resulting pellets were treated with a compact injection molding machine HM-7DENKEY manufactured by NISSEI PLASTIC INDUSTRIAL CO., LTD. under a basic conditions at a melting temperature of 300° C. and various kinds of specimens were prepared.
(Organic polymer:Metal alkoxide=90.6:9.4~90:10)

EXAMPLE 3

1500 g of polysulfone manufactured by Aldrich Chemical Company, Inc. and 16.6 g of MKC Silicate MS-56 manufactured by MITSUBISHI CHEMICAL CORPORATION were mixed uniformly with a Henschel mixer Model FM10B manufactured by Mitsui-Miike Chemical Engineering Machines Co., Ltd. The resulting mixture was charged into a compact high-speed twin screw extruder Model KZW15-45MG manufactured by TECHNOVEL CORPORATION and was melt-kneaded at a feeder rotation speed of 60 rpm, a screw rotation speed of 200 rpm and a temperature of 330° C. A strand discharged was cooled and was pelletized with a pelletizer. The resulting pellets were treated with a compact injection molding machine HM-7DENKEY manufactured by NISSEI PLASTIC INDUSTRIAL CO., LTD. under a basic conditions at a melting temperature of 350° C. and various kinds of specimens were prepared.
(Organic polymer:Metal alkoxide=98.9:1.1~99:1)

EXAMPLE 4

1500 g of polyarylate (U-Polymer) manufactured by UNITIKA LTD. was charged into a compact high-speed twin screw extruder Model KZW15-45MG manufactured by TECHNOVEL CORPORATION. While the polyarylate was treated at a feeder rotation speed of 60 rpm, a screw rotation speed of 150 rpm and a temperature of 300° C., 156 g of tetraethoxysilane was charged slowly with a liquid feeder and melt-kneading was carried out. A strand discharged was cooled and was pelletized with a pelletizer. The resulting pellets were treated with a compact injection molding machine HM-7DENKEY manufactured by NISSEI PLASTIC INDUSTRIAL CO., LTD. under a basic conditions at a melting temperature of 320° C. and various kinds of specimens were prepared.
(Organic polymer:Metal alkoxide=90.6:9.4~90:10)

EXAMPLE 5

1500 g of polyethylene terephthalate manufactured by Aldrich Chemical Company, Inc. and 16.6 g of MKC Silicate MS-56 manufactured by MITSUBISHI CHEMICAL CORPORATION were mixed uniformly with a Henschel mixer Model FM10B manufactured by Mitsui-Miike Chemical Engineering Machines Co., Ltd. The resulting mixture was charged into a compact high-speed twin screw extruder Model KZW15-45MG manufactured by TECHNOVEL CORPORATION and was melt-kneaded at a feeder rotation speed of 60 rpm, a screw rotation speed of 200 rpm and a temperature of 280° C. A strand discharged was cooled and was pelletized with a pelletizer. The resulting pellets were treated with a compact injection molding machine HM-7DENKEY manufactured by NISSEI PLASTIC INDUSTRIAL CO., LTD. under a basic conditions at a melting temperature of 280° C. and various kinds of specimens were prepared.
(Organic polymer:Metal alkoxide=99:1)

EXAMPLE 6

1500 g of polyamide (Nylon 6/6) manufactured by Aldrich Chemical Company, Inc. was charged into a compact high-speed twin screw extruder Model KZW15-45MG manufactured by TECHNOVEL CORPORATION. While the polyamide was treated at a feeder rotation speed of 80 rpm, a screw rotation speed of 200 rpm and a temperature of 280° C., 156 g of tetraethoxysilane was charged slowly with a liquid feeder and melt-kneading was carried out. A strand discharged was cooled and was pelletized with a pelletizer. The resulting pellets were treated with a compact injection molding machine HM-7DENKEY manufactured by NISSEI PLASTIC INDUSTRIAL CO., LTD. under a basic conditions at a melting temperature of 290° C. and various kinds of specimens were prepared.
(Organic polymer:Metal alkoxide=90.6:9.4~90:10)

EXAMPLE 7

1500 g of polymethyl methacrylate manufactured by Aldrich Chemical Company, Inc. was charged into a compact high-speed twin screw extruder Model KZW15-45MG manufactured by TECHNOVEL CORPORATION. While the polymethyl methacrylate was treated at a feeder rotation speed of 80 rpm, a screw rotation speed of 200 rpm and a temperature of 210° C., 156 g of tetraethoxysilane was charged slowly with a liquid feeder and melt-kneading was carried out. A strand discharged was cooled and was pelletized with a pelletizer. The resulting pellets were treated with a compact injection molding machine HM-7DENKEY manufactured by NISSEI PLASTIC INDUSTRIAL CO., LTD. under a basic conditions at a melting temperature of 220° C. and various kinds of specimens were prepared.

Comparative Examples 1 to 6

Polycarbonate (Comparative Example 1), polysulfone (Comparative Example 2), polyarylate (Comparative Example 3), polyethylene terephthalate (Comparative Example 4), polyamide (Comparative Example 5) and polymethyl methacrylate (Comparative Example 6) the same as those used in Examples 1 to 7 were, respectively, charged into a compact high-speed twin screw extruder Model KZW15-45MG manufactured by TECHNOVEL CORPORATION. Melt-kneading was carried out under suitable conditions. For each polymer, a strand discharged was cooled and was pelletized with a pelletizer. The resulting pellets were treated with a compact injection molding machine HM-7DENKEY and various kinds of specimens were prepared.

Comparative Example 7

45 g of polycarbonate (Iupilon) manufactured by Mitsubishi Engineering-Plastics Corporation and 0.5 g of MKC Silicate MS-56 manufactured by MITSUBISHI CHEMICAL CORPORATION were charged into a Brabender HBI System Model 90 and were mixed at 280° C. for 10 minutes. The resulting mixture was taken out, cooled, and, thereafter, crushed with a crusher. The resulting crushed material was treated with a compact injection molding machine HM-7DENKEY manufactured by NISSEI PLASTIC INDUSTRIAL CO., LTD. under a basic conditions at a melting temperature of 300° C. and various kinds of specimens were prepared.
(Organic polymer:Metal alkoxide=99:1)

Comparative Example 8

1500 g of polycarbonate (Iupilon) manufactured by Mitsubishi Engineering-Plastics Corporation and 3.0 g of fine particulate silica were mixed uniformly with a Henschel mixer Model FM1OB manufactured by Mitsui-Miike Chemical Engineering Machines Co., Ltd. The resulting mixture was charged into a compact high-speed twin screw extruder Model KZW15-45MG manufactured by TECHNOVEL CORPORATION and was melt-kneaded at a feeder rotation speed of 50 rpm, a screw rotation speed of 200 rpm and a temperature of 280° C. A strand discharged was cooled and was pelletized with a pelletizer. The resulting pellets were treated with a compact injection molding machine HM-7DENKEY manufactured by NISSEI PLASTIC INDUSTRIAL CO., LTD. under a basic conditions at a melting temperature of 300° C. and various kinds of specimens were prepared.

(Organic polymer:Fine particulate silica=99.8:0.2)

Ashing Test (According to JIS K 7052)

For the purpose of ascertaining the metal oxide content in polymeric materials, a test was carried out. 3 to 5 g of sample was charged into a porcelain crucible. By use of a gas burner, volatile components were removed and low-temperature-decomposable components were burned. The crucible was subsequently transferred into a muffle electric furnace and the sample was incinerated through heating at 630° C. for at least 3 hours. From the weight of the resulting white ash, the metal oxide content in the material was calculated. The test results are shown in Table. 1. The results of the test confirmed that the polymeric materials of Examples contained about 0.2% of metal oxide and inorganic components.

Rockwell Hardness Test (According to JIS K 7202)

For the purpose of ascertaining the hardness of polymeric materials, a test was carried out. Before a test, a specimen was subjected to conditioning by being left in a thermostatic chamber at a temperature of 24° C. and a humidity of 58% for at least 48 hours. As an instrument, Model ORK manufactured by Akashi Seisakusho Co., Ltd. The test load and the test scale were determined suitably depending upon the kind of organic polymers. The test results are shown in Table. 1.

The hardness of the polymeric material prepared in each Example was compared with that of the plastics (Comparative Examples 1 to 6) to be used as a matrix. As a result, improvement in hardness was found for all of the Examples. This result is probably caused by metal oxides and inorganic components contained in a polymeric material. The polycarbonate type polymeric materials (Examples 1 and 2) were compared also with Comparative Example 7. As a result, the polymeric materials of the present invention had greater hardnesses. The material of Comparative Example 7 probably resulted in an insufficient reaction of the metal oxide compound due to a low kneading performance of the instrument used in spite of a sufficient treatment time. Judging from those facts, it is probable that metal oxides and inorganic components are present almost uniformly and in good conditions in the polymeric materials prepared by the production method of the present invention.

Tensile Test (According to JIS K 7113)

For the purpose of ascertaining the mechanical characteristics of polymeric materials, a test was carried out. As a specimen, a half-size first type specimen provided in JIS K 7113 was used. Before a test, a specimen was subjected to conditioning by being left in a thermostatic chamber at a temperature of 24° C. and a humidity of 58% for at least 48 hours. As an instrument, AUTOGRAPH DSS-5000 manufactured by Shimadzu Corporation. The load cell and the test speed were set to 500 kgf and 10 m/min, respectively. The test results are shown in Table. 2.

The tensile yield strength, the tensile elastic modulus, and tensile breaking elongation of the polymeric material prepared in each Example were compared with those of the plastics (Comparative Examples 1 to 6) to be used as a matrix. As a result, improvement in yield strength and elastic modulus was found for all of the Examples. This result is probably caused by metal oxides and inorganic components contained in a polymeric material. The polycarbonate type polymeric materials (Examples 1 and 2) were compared also with Comparative Example 7. The polymeric materials of the present invention had a greater strength and a greater elastic modulus. This fact confirmed that the polymeric materials of the present invention contained metal oxides and inorganic components uniformly and in good conditions and that those polymeric materials had great mechanical characteristics.

Bending Test (According to JIS K 7171)

A test was carried out for the purpose of ascertaining the mechanical strength of polymeric materials. As a specimen, a standard specimen provided in JIS K 7171 was used. Before a test, a specimen was subjected to conditioning by being left in a thermostatic chamber at a temperature of 24° C. and a humidity of 58% for at least 48 hours. As an instrument, AUTOGRAPH DSS-5000 manufactured by Shimadzu Corporation. The load cell and the test speed were set to 100 kgf and 2 m/min, respectively. The test results are shown in Table. 2.

The bending strength of the polymeric material prepared in each Example was compared with that of the plastics (Comparative Examples 1 to 6) to be used as a matrix. As a result, improvement in bending strength was found for all of the Examples. The polycarbonate type polymeric materials (Examples 1 and 2) were compared also with Comparative Example 7. The polymeric materials of the present invention had a greater strength. This tendency is similar to that found in the tensile test and is probably caused by metal oxides and inorganic components contained in polymeric materials.

Izod Impact Test (According to JIS K 7110)

For ascertaining the impact resistance of polymeric materials, evaluation was made for some materials. As a specimen, a second type specimen of A notch type provided in JIS K 7110 was used. Before a test, a specimen was subjected to conditioning by being left in a thermostatic chamber at a temperature of 24° C. and a humidity of 58% for at least 48 hours. As an instrument, an Izod tester manufactured by Toyo Seiki Seisaku-Sho, Ltd. The results of the test are shown in Table. 2.

The polycarbonate-type polymeric materials prepared in Examples 1 and 2 were evaluated and were compared to a polycarbonate (Comparative Example 1) and Comparative Example 8. As a result, the polymeric materials of the present invention had an impact strength equivalent to that of the polycarbonate. The material of Comparative Example 8 obtained by dispersing fine particulate silica in polycarbonate had a greatly reduced impact strength. These results are caused by conditions of metal oxides and inorganic components in a polymeric material. The impact resistance of the polymeric materials of the present invention was not damaged probably because they contained an organic-inorganic hybrid polymer material as a component.

Haze Test

For the purpose of ascertaining the transparency of polymeric materials, an evaluation was made for some materials. As a specimen, a second type specimen provided in JIS K 7110 was used. As an instrument, Haze Meter NDH2000 manufactured by Nippon Denshoku Industries Co., Ltd. The results of the test are shown in Table. 3.

The polycarbonate-type polymeric materials prepared in Examples 1 and 2 were evaluated and were compared to a polycarbonate (Comparative Example 1) and Comparative Example 8. As a result, although the material of Comparative Example 8 obtained by dispersing fine particulate silica in polycarbonate had a reduced transparency, the polymeric materials of the present invention exhibited a transparency equivalent to or higher than that of the polycarbonate. Judging from this fact, the size of the silica contained in the polymeric materials of the present invention possibly is far smaller than that of commercially available fine particulate silica and has no adverse effect on the transparency of polymeric materials.

Dynamic Viscoelasticity Test

For the purpose of ascertaining the heat resistance of polymeric materials, an evaluation was made for some materials. As a specimen, a second type specimen provided in JIS K 7110 was used after being cut into a suitable length. A test was carried out at a bending mode using, as an instrument, a viscoelasticity spectrometer SDM5600 manufactured by Seiko Instruments Inc. The rate of raising temperature, the test temperature and the frequency were set to 2° C./min, 20 to 210° C., and 1 Hz, respectively. The heat resistance of a material was evaluated based on the softening and melting temperature of a specimen determined from a storage elastic modulus curve. The results of the test are shown in Table. 4.

The polycarbonate-type polymeric materials prepared in Examples 1 and 2 were evaluated and were compared to a polycarbonate (Comparative Example 1) and Comparative Example 8. This comparison confirmed that although the heat resistance of the material of Comparative Example 8 obtained by dispersing fine particulate silica in polycarbonate had a heat resistance equivalent to that of the polycarbonate, the polymeric materials of the present invention exhibited improvement in heat resistance. The difference between Examples 1 and 2 and Comparative Example 8 is probably caused by difference in occurring conditions of metal oxides and inorganic components in a polymeric material.

TABLE 1

Metal oxide content and hardness of polymeric material

| Sample | Metal oxide content (%) | Rockwell hardness |
|---|---|---|
| Comparative Example 1 | lower than 0.01 | L89 |
| Comparative Example 7 | 0.07 | L91 |
| Comparative Example 8 | 0.22 | — |
| Example 1 | 0.20 | L98 |
| Example 2 | 0.18 | L98 |
| Comparative Example 2 | lower than 0.01 | L85 |
| Example 3 | 0.21 | L97 |
| Comparative Example 3 | lower than 0.01 | R61 |
| Example 4 | 0.18 | R69 |
| Comparative Example 4 | lower than 0.01 | M96 |
| Example 5 | 0.21 | M107 |
| Comparative Example 5 | lower than 0.01 | R107 |
| Example 6 | 0.23 | R117 |
| Comparative Example 6 | lower than 0.01 | M95 |
| Example 7 | 0.25 | M105 |

TABLE 2

Mechanical strength of polymeric material

| | Tensile characteristics | | | Bending characteristics | Impact resistance |
|---|---|---|---|---|---|
| Sample | Yield strength (MPa) | Breaking elongation (%) | Modulus of elasticity (MPa) | Bending strength (MPa) | Impact strength (kJ/m$^2$) |
| Comparative Example 1 | 59 | 114 | 1980 | 85 | 70 |
| Comparative Example 7 | 64 | 103 | 2080 | 90 | — |
| Comparative Example 8 | — | — | — | — | 55 |
| Example 1 | 78 | 111 | 2270 | 115 | 67 |
| Example 2 | 75 | 113 | 2240 | 110 | 69 |
| Comparative Example 2 | 71 | 95 | 2050 | 105 | — |
| Example 3 | 87 | 93 | 2400 | 128 | — |
| Comparative Example 3 | 70 | 70 | 1400 | 78 | — |
| Example 4 | 86 | 68 | 1790 | 95 | — |
| Comparative Example 4 | 50 | 71 | 2910 | 105 | — |
| Example 5 | 65 | 70 | 3180 | 134 | — |
| Comparative Example 5 | 68 | 53 | 2030 | 84 | — |
| Example 6 | 80 | 53 | 2450 | 97 | — |
| Comparative Example 6 | 53 | 4 | 2320 | 77 | — |
| Example 7 | 66 | 4 | 2600 | 99 | — |

TABLE 3

Transparency of polymeric material°

| Sample | Haze value |
|---|---|
| Comparative Example 1 | 16.7 |
| Comparative Example 8 | 19.4 |
| Example 1 | 14.1 |
| Example 2 | 13.8 |

TABLE 4

Heat resistance of polymeric material

| Sample | Softening and melting temperature (° C.) |
|---|---|
| Comparative Example 1 | 171 |
| Comparative Example 8 | 172 |
| Example 1 | 191 |
| Example 2 | 192 |

What is claimed is:

1. A polymeric material obtained by melt-kneading, using a kneading apparatus, a resin composition that contains an organic polymer not having any metal alkoxy group and a metal alkoxide compound and that contains no organic polymer having a metal alkoxy group.

2. The polymeric material according to claim 1 wherein the kneading apparatus is a single screw extruder or a twin screw extruder.

3. The polymeric material according to claim 1 wherein the organic polymer comprises at least an organic polymer having an ester bond, a carbonate bond, an amide bond, or an urethane bond.

4. The polymeric material according to claim 1 wherein the organic polymer comprises at least one kind of organic polymer selected from the group consisting of polyester, polycarbonate, polyarylate, polysulfone, polyamide and polyacrylate.

5. The polymeric material according to claim 1 wherein the organic polymer comprises at least polycarbonate.

6. The polymeric material according to claim 1 wherein the metal element of the metal alkoxide compound is at least one selected from the group consisting of Si, Ti and Zr.

7. The polymeric material according to claim 1 wherein the metal element of the metal alkoxide compound is Si.

8. A molded product obtained by processing the polymeric material according to claim 1 using a molding machine.

9. The molded product according to claim 8 wherein the molding machine is an injection molding machine or an extrusion molding machine.

10. A polymeric material obtained by melt-kneading, using a kneading apparatus, a resin composition that contains an organic polymer not having any metal alkoxy group and a metal alkoxide compound and that contains no organic polymer having a metal alkoxy group, thereby the metal alkoxide compound being allowed to react.

11. The polymeric material according to claim 10 wherein the kneading apparatus is a single screw extruder or a twin screw extruder.

12. The polymeric material according to claim 10 wherein the organic polymer comprises at least an organic polymer having an ester bond, a carbonate bond, an amide bond, or an urethane bond.

13. The polymeric material according to claim 10 wherein the organic polymer comprises at least one kind of organic polymer selected from the group consisting of polyester, polycarbonate, polyarylate, polysulfone, polyamide and polyacrylate.

14. The polymeric material according to claim 10 wherein the organic polymer comprises at least polycarbonate.

15. The polymeric material according to claim 10 wherein the metal element of the metal alkoxide compound is at least one selected from the group consisting of Si, Ti and Zr.

16. The polymeric material according to claim 10 wherein the metal element of the metal alkoxide compound is Si.

17. A molded product obtained by processing the polymeric material according to claim 10 using a molding machine.

18. The molded product according to claim 17 wherein the molding machine is an injection molding machine or an extrusion molding machine.

19. A polymeric material obtained by melt kneading, using a kneading apparatus, a resin composition that contains an organic polymer not having any metal alkoxy group and a metal alkoxide compound and that contains no organic polymer having a metal alkoxy group, thereby the organic polymer and the metal alkoxide compound being allowed to react.

20. The polymeric material according to claim 19 wherein the kneading apparatus is a single screw extruder or a twin screw extruder.

21. The polymeric material according to claim 19 wherein the organic polymer comprises at least an organic polymer having an ester bond, a carbonate bond, an amide bond, or an urethane bond.

22. The polymeric material according to claim 19 wherein the organic polymer comprises at least one kind of organic polymer selected from the group consisting of polyester, polycarbonate, polyarylate, polysulfone, polyamide and polyacrylate.

23. The polymeric material according to claim 19 wherein the organic polymer comprises at least polycarbonate.

24. The polymeric material according to claim 19 wherein the metal element of the metal alkoxide compound is at least one selected from the group consisting of Si, Ti and Zr.

25. The polymeric material according to claim 19 wherein the metal element of the metal alkoxide compound is Si.

26. A molded product obtained by processing the polymeric material according to claim 19 using a molding machine.

27. The molded product according to claim 26 wherein the molding machine is an injection molding machine or an extrusion molding machine.

28. A method for producing a polymeric material comprising a step of melt-kneading, using a kneading apparatus, a resin composition that contains an organic polymer not having any metal alkoxy group and a metal alkoxide compound and that contains no organic polymer having a metal alkoxy group.

29. The method according to claim 28 wherein the kneading apparatus is a single screw extruder or a twin screw extruder.

30. The method according to claim 28 wherein the organic polymer comprises at least an organic polymer having an ester bond, a carbonate bond, an amide bond, or an urethane bond.

31. The method according to claim 28 wherein the organic polymer comprises at least one kind of organic polymer selected from the group consisting of polyester, polycarbonate, polyarylate, polysulfone, polyamide and polyacrylate.

32. The method according to claim 28 wherein the organic polymer comprises at least polycarbonate.

33. The method according to claim 28 wherein the metal element of the metal alkoxide compound is at least one selected from the group consisting of Si, Ti and Zr.

34. The method according to claim 28 wherein the metal element of the metal alkoxide compound is Si.

35. A method for producing a molded product comprising a step of processing the polymeric material according to claim 1 using a molding machine.

36. The method according to claim 35 wherein the molding machine is an injection molding machine or an extrusion molding machine.

37. A method for producing a molded product comprising a step of processing the polymeric material according to claim 10 using a molding machine.

38. The method according to claim 37 wherein the molding machine is an injection molding machine or an extrusion molding machine.

39. A method for producing a molded product comprising a step of processing the polymeric material according to claim 19 using a molding machine.

40. The method according to claim 39 wherein the molding machine is an injection molding machine or an extrusion molding machine.

41. The polymeric material according to claim 1, wherein the metal alkoxide compound is a compound represented by the formula:

$$A_p M \qquad (1)$$

wherein A is an alkoxy group having from 1 to 8 carbon atoms, M indicates a metal element selected from the group consisting of Si, Ti, Zr, Fe, Cu, Sn, B, Al, Ge, Ce, Ta and W, and p is an integer of from 2 to 6, or by the formula:

$$R_k A_l M(R'_m X)_n \qquad (2)$$

wherein R is a hydrogen or alkyl group having from 1 to 12 carbon atoms or a phenyl group, A is an alkoxy group having from 1 to 8 carbon atoms, M indicates a metal element selected from the group consisting of Si, Ti, Zr, Fe, Cu, Sn, B, Al, Ge, Ce, Ta and W, R' is an alkylene or alkylidene group having from 1 to 4 carbon atoms, X represents an isocyanate group, an epoxy group, a carboxyl group, an acid halide group, an acid anhydride group, an amino group, a thiol group, a vinyl group, a methacryl group or a halogen group, k is an integer of from 0 to 5, l is an integer of from 1 to 5, m is 0 or 1, and n is an integer of from 0 to 5.

42. The polymeric material according to claim 10, wherein the metal alkoxide compound is a compound represented by the formula: (1) or (2).

43. The method according to claim 28, wherein the metal alkoxide compound is a compound represented by the formula: (1) or (2).

* * * * *